United States Patent [19]
Torini

[11] Patent Number: 5,597,493
[45] Date of Patent: Jan. 28, 1997

[54] DEVICE AND METHOD TO SEPARATE THE COMPONENTS IN MIXTURE OF NON-MISCIBLE LIQUIDS

[75] Inventor: Alberto Torini, Milan, Italy

[73] Assignee: Italtraco S.r.L., Milan, Italy

[21] Appl. No.: 325,464

[22] PCT Filed: Apr. 30, 1993

[86] PCT No.: PCT/EP93/01053

§ 371 Date: Mar. 23, 1995

§ 102(e) Date: Mar. 23, 1995

[87] PCT Pub. No.: WO93/22023

PCT Pub. Date: Nov. 11, 1993

[30] Foreign Application Priority Data

Apr. 30, 1992 [IT] Italy .................... MI92A1045

[51] Int. Cl.$^6$ .................................................. C02F 1/40
[52] U.S. Cl. .................. 210/799; 210/433.1; 210/484; 210/496; 210/DIG. 5
[58] Field of Search .............................. 210/799, 801, 210/299, 433.1, 456, 435, 484, 496, 505, DIG. 5, 265, 289

[56] References Cited

U.S. PATENT DOCUMENTS

| | | | |
|---|---|---|---|
| 654,965 | 7/1900 | Tromke | 210/540 |
| 748,481 | 1/1904 | Oliver | 210/540 |
| 1,147,881 | 7/1915 | Morris | 210/540 |
| 2,522,378 | 9/1950 | Kirkbride | 210/DIG. 5 |
| 2,588,794 | 3/1952 | Barton | 210/DIG. 5 |
| 2,747,684 | 5/1956 | Lewis et al. | 210/DIG. 5 |
| 3,195,295 | 7/1965 | Muller | 210/DIG. 5 |
| 3,925,202 | 12/1975 | Hirs | 210/274 |
| 3,957,638 | 5/1976 | in't Veld | 210/540 |
| 4,059,511 | 11/1977 | Musha et al. | 210/DIG. 5 |
| 4,061,573 | 12/1977 | Biron | 210/282 |
| 4,074,791 | 3/1977 | Tuttle | 210/519 |
| 4,242,207 | 12/1980 | Ford | 210/500.1 |
| 5,368,747 | 11/1974 | Rymal, Jr. et al. | 210/DIG. 5 |

FOREIGN PATENT DOCUMENTS

| | | |
|---|---|---|
| 895586 | 1/1945 | France . |
| 3644665 | 7/1988 | Germany . |
| WO89/06567 | 7/1989 | WIPO . |

*Primary Examiner*—Christopher Upton
*Attorney, Agent, or Firm*—Hill, Steadman & Simpson

[57] ABSTRACT

The device (1) separates two components of a mixture (11) of non-miscible liquids, especially water or salt water and oils. The device (1) consists of a hollow body (2), having an inlet port (4) to feed the mixture (11) and outlet ports (5,6) to discharge the separated components, and a filter (7) formed of a loosely packed hydrophilic material (8) in fibers, and positioned between the inlet port (4) and the outlet port (5) of the separated water. The filter (7), when soaked with clean water, lets through only the water component of the mixture (11), while the oil component is repelled therefrom. The method separates the components of a mixture of non-miscible liquids, making use of the device specified heretofore.

31 Claims, 1 Drawing Sheet

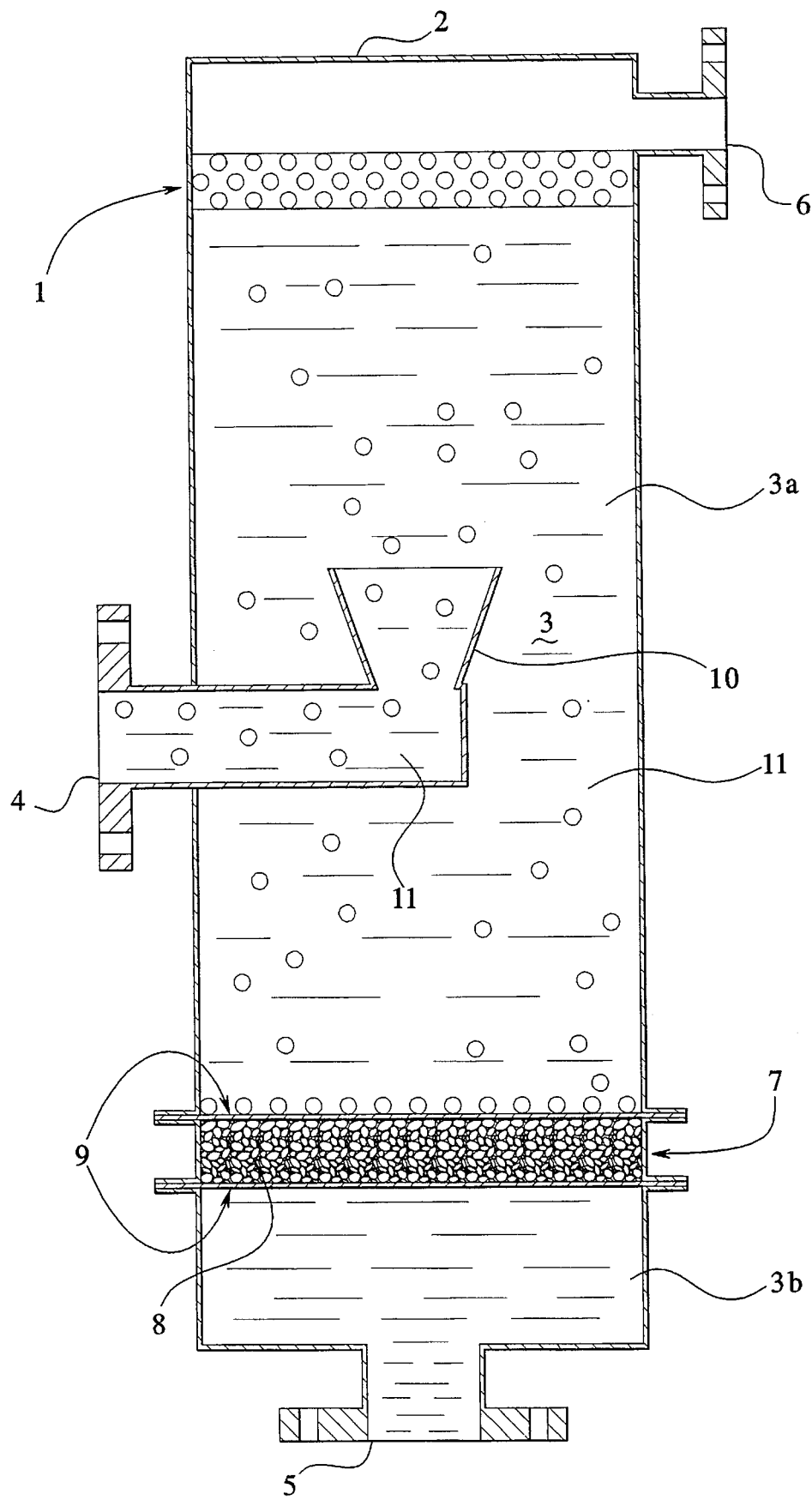

DEVICE AND METHOD TO SEPARATE THE COMPONENTS IN MIXTURE OF NON-MISCIBLE LIQUIDS

BACKGROUND OF THE INVENTION

The problem of separating oily or hydrocarbon substances (hereinafter simply referred to as "oils") dispersed into aqueous solutions, namely of the total separation of the insoluble oily phase from the aqueous phase containing the dispersed fraction of the oily phase, has been examined by various experts, and different techniques have been proposed and used up to date.

In the separation process, the difficulty notably increases when wishing to reduce to a minimum the residual amount of oils in water, after separation. This difficulty determines also an increase in the operating costs.

The known techniques adopted so far include, for example, absorption on active substances (e.g. active carbon), distillation, decantation through packed blades, ultra-filtration and centrifugation.

All the aforecited techniques show some inconveniences which greatly limit their feasibility, especially when operating on large quantities of water which must be "cleaned" from oil residues to the greatest possible extent: gravimetric separations, for instance, are limited by the availability of sufficient differences of density between the aqueous phase and the oily phase, especially when treating very fine emulsions: thermic separations involve considerable energy costs and are unproposable for application on a vast scale, as in oil separation from surface waters; the techniques making use of membranes have the drawback of low productivity and suffer from fouling problem.

It is of common knowledge, now-a-days, that huge volumes of oil-polluted surface waters have to be treated so as to restore the proper environmental conditions, since the presence of oils is harmful for the environment, the water life and the general use of the water resources. There is hence at present an unsatisfied demand for an innovating technology, apt to be economically applied—in removing oils from water—on a vast scale.

SUMMARY OF THE INVENTION

The main object of the present invention is to provide a solution to the technical problem set forth hereabove.

The present invention therefore proposes a device to separate two components of a mixture of at least partially non-miscible liquids, characterized in that it consists of a hollow body having an inlet port to feed said mixture, a first outlet port and a second outlet port to respectively discharge the separated heavier and lighter components of said mixture, and a filter thoroughly soaked—until all air is expelled therefrom—with one of the components of said mixture, said filter being positioned between said inlet port and the outlet port of the soaking component.

Preferably, one of said liquids is water—or a liquid similar to water or apt to be mixed therewith—and at least another one is an oily liquid, and said filter is formed of hydrophilic material.

The invention also proposes a method to separate two components of a mixture of at least partially non-miscible liquids, carried out into a chamber having an inlet port to feed said mixture and outlet ports to discharge the separated components, characterized in that it comprises the following preliminary discontinuos step:

a) dipping a filter positioned between said inlet port and one of said outlet ports into one of the components of said mixture, up to fully expelling any air trapped in the filter, and thoroughly soaking the filtering bed;

and the subsequent continuos steps:

b) causing said mixture to pass through said previously soaked and deaerated filter under a predetermined hydrostatic head;

c) recovering one of the separated components, and precisely the one used in the soaking step a), from the outlet port facing the side of the filter opposite to that facing the inlet port;

d) recovering the other separated component from the outlet port facing the same side of the filter as the inlet port.

BRIEF DESCRIPTION OF THE DRAWING

Further characteristics and advantages of the present invention will anyhow be more evident from the following detailed description, given with reference to the accompanying drawing, which is a diagrammatic cross-section view of a preferred embodiment of the device according to the invention.

DESCRIPTION OF THE PREFERRED EMBODIMENT

As shown on the drawing, the device 1 consists of a static hollow body 2, which defines a chamber 3 and is provided with a side inlet port 4 to feed the mixture 11 to be separated, and with a lower port 5 and an upper lateral port 6 to respectively let out the heavier (water) and the lighter (oil) components of the mixture 11 which have been separated. To improve the efficiency of the device 1 and make its construction more economic, the hollow body 2 is preferably of elongated cylindrical shape—as can be seen from the drawing—and has a circular or rectangular cross-section.

The chamber 3 is divided into an upper chamber 3a and a lower chamber 3b by a filter 7, sealed to the walls of the hollow body 2 in a position set between the inlet port 4 and the lower outlet port 5. The filter 7 is fixed to the walls of the hollow body 2 in any suitable way, as for example by flanges, so as to prevent any channelizing between the lateral surface of the filter 7 and the walls of the hollow body 2. The filter 7 is formed of a hydrophilic material 8, preferably consisting of short fibres, housed between a pair of wire or plastic nets 9, or any other means allowing to keep in position the filtering material 8, but letting through the liquid flow. The meshes of the nets 9 should be sufficiently close not to let through the hydrophilic material 8, and sufficiently wide to let through the water at the wanted flow rate. The mechanical structure of the filter 7 supporting the nets 9 is formed in known manner and must be apt to withstand the hydraulic stresses determined by the normal filtering flow, as well as by the reverse-flow of the water initially used to prepare and, thereafter, to possibly clean the filter 7, without impairing or unduly packing the hydrophilic material 8 contained therein.

It has been found by the inventor that said hydrophilic material 8 should preferably be in finely divided form, the single particles preferably having one of their dimensions larger than the other two. Said hydrophilic material 8 is stratified or otherwise casually positioned in the filter 7 and, when dipped into water, it is apt to form an almost continuous system of micro-channels through which flows the water during use of said filter 7.

According to the invention, the hydrophilic material 8 apt to form the bed of said filter 7 preferably consists of short portions—hereinafter referred to as "fibrils"—of natural fibers (for instance cotton, wool, flax, etc.), either on their own or mixed with other natural or synthetic fibers containing polar groups having hydrophilic properties. In particular, a material suited for the purpose could consist of spinning wastes or of the fiber "tuft" produced as waste or spinning dust in the spinning operations.

It is an important characteristic of the invention that the hydrophilic material 8 be made of fibrils of predetermined size. The size of the fibrils should not be too small, or it would cause the packing of the filter bed of hydrophilic material and thereby drastically reduce the specific water flow rate through the filter 7. On the other hand, it should not be too large, as this could cause channelizing and thereby reduce the efficiency of the filter 7. The fibrils should thus preferably have a diameter between 10 and 3.000 micron and a length from 2 to 50 mm.

Since the material 8 has to be hydrophilic, the fibers of vegetable origin—as cotton, flax, hemp—and some fibers of animal origin—as wool—are the most suited for the purpose. Among the synthetic fibers, use can be made of those deriving from resins which have a sufficient degree of polarity, as acrylic, polyamidic, cellulosic and polyurethanic resins.

The thickness of the layer of hydrophilic material 8 forming the filter 7 will be for example between about 1 cm and 10 cm (preferably 2–5 cm). For an efficient separation at high flow rates, the layer of fibrils should preferably remain very soft; in other words, the fibrils should be loosely packed, to the extent that the single fibrils are simply kept in mutual contact, without being unduly compressed. The proportion of voids in the packed filter 7 (intended as ratio between the volume of voids in the filter and the overall volume of the filter) is thus preferably in the range from 5 to 80%. To prevent an excessive packing of the filter bed. the fibrils of natural origin (e.g. cotton) should preferably be mixed with acrylic or synthetic fibrils which, undergoing no mechanical changes with water, form the anti-packing agent for the natural fibrils. The added synthetic fibrils can also be in the form of "tufts". As an alternative to said mixture, the filter 7 can be formed by alternating layers of natural fibrils with layers of synthetic fibrils. The filter bed can be obtained also with the techniques of the non-woven cloths.

Other important advantages of the hydrophilic material 8 of the present invention are its chemical resistance in the different working environments and the possibility to be recycled with non-polluting methods, as through composting techniques.

The fibrils of hydrophilic material 8 can be used in their natural state, namely as they are produced as spinning wastes, but they can also be more conveniently pretreated, so as to supply a filter bed of higher quality and, above all, of further homogeneity.

A first pretreatment consists in a washing step with surface-active agents—so as to eliminate any fatty matters and dressings adhering to the fibrils—followed by a light oxidation with 5–10% hydrogen peroxide, at 30°–40° C., which is meant to activate the surface of the fibrils, giving them higher hydrophilic properties. The "water carding" operation is subsequently carried out, to make the fibrils soft and smooth. There follows a drying operation, and then the mixing into a fast ploughshare mixer of the Lodige type, in order to obtain a homogeneous mixture between the various types of fibrils, according to the requirements of the invention.

According to the separation method of the present invention, the aforedescribed device 1 is used as follows. To start with, clean water is introduced from the lower port 5, until the filter 7 is soaked with water up to complete filling of each interspace between the fibrils of hydrophilic material 8 and up to forming a water layer above the filter 7 thus soaked. The dipping of the filter 7 into clean water continues until all the air present in the filter has been fully expelled and the single fibrils have totally swollen.

This preliminary step of the separation method according to the invention is particularly important and has to be carried out correctly for the device 1 to work efficiently in separating the water/oil mixture 11. In fact, according to the inventor, the soaking water should substantially occupy three different positions—the water absorbed inside the fibrils; the water adhering to the surface of the fibrils; the water forming a bridge between one fibril and the next—thereby creating a hydrophilic barrier.

According to a plausible explanation for the extremely efficient, performances of the device according to the present invention—explanation given by mere way of example and in no way to be considered as limiting the invention itself—the particular nature of the filter 7 and its thorough soaking before starting the separation, allow in fact to form over its surface a laminar layer of water molecules, strongly bound both one to the other and to the hydrophilic material 8. Said laminar layer thus forms an impenetrable hydrophilic barrier for the oil drops contained in the mixture 11 to be separated. The water molecules can in fact flow through said barrier, while the oil drops are prevented from passing through.

One then proceeds to feed into the device 1, through the port 4, the mixture 11 to be separated, for instance water (dashed lines in the drawing) and oil (small circles in the drawing). For this purpose, the port 4 extends into the hollow body 2 with a duct ending into a conical diffuser 10 facing upwards, so as to prevent any eddy flow from reaching the surface of the filter 7, which could hamper the proper forming of the aforedescribed laminar water layer. In fact, thanks to this configuration. the flow of mixture 11 to be treated in the part overlying the filter 7 is a laminar flow with maximum speeds between a fraction and a few cm/sec, preferably between 0.1 and 10 cm/sec.

The mixture 11 thereby fills the chamber 3, the level of its surface being determined by the height of the free outlet port 6, thereby creating an hydrostatic head on the filter 7. Preferably, the purified liquid is discharged from the port 5 through a trap device (not shown) which easily guarantees a constant head on the filter 7, equal to the weight of the liquid column between the port 6 and the outlet of said trap device. The outlet of the trap device will preferably be positioned higher than the filter 7, so as to maintain the chamber 3b constantly filled with liquid.

Said hydrostatic head is by itself sufficient to allow the flow of liquid through the filter 7. When the single tiny emulsified oil drops reach the laminar water layer formed on the filter 7, they are stopped from passing through said filter, until—coalescing with other oil drops—they reach dimensions sufficient to create a buoyancy force higher than the entrainment force of the water flow, whereby the oil collects at the top of the hollow body 2 and is let out through the port 6. Suitable control devices of known type provide to keep the oil/mixture separation surface, in the chamber 3a, at a level below the height of the port 6, so as to prevent any mixture outlets from said port.

It is thus surprising to note that, in the device 1 of the present invention, the oil drops are stopped from penetrating into the filter 7, but remain over its surface. The filter 7 does not hence require to be regenerated, nor periodically replaced, unless—due to a wrong preparation of said filter, or to any other accidental causes —the laminar water layer formed on the surface of the filter 7 should break, thereby creating inside said filter channelizings of non-purified mixture. Said separation effect is schematically shown on the drawing by the oil drops (circles) collecting above the laminar water layer of the filter 7. In the meantime, the water of the mixture 11, separated from the oil, penetrates through the laminar water layer and then through the soaked filter 7, and finally flows out of the port 5.

As it can be understood from the above description, the present invention realizes a physical separation system, wherein the mixture 11 to be treated—comprising a continuous aqueous phase having an oily phase dispersed therein—is separated into the two water and oil components, the aqueous phase—practically free from oil—penetrating through the filtering unit of the system, while the dispersed oily phase gradually coalesces into a continuous oily phase, up to allowing its full recovery in an economic way.

The motive power required to separate the water and oil components can be limited to that, generated by the free hydrostatic head of the mixture 11 to be treated. Said hydrostatic head on the filter bed can vary from 0.05 to 5 meters of water, with a flowing speed from 0.1 to 10 cm/sec. Otherwise, the flow can be obtained by pumping the mixture 11 to be filtered at the desired pressure.

In synthesis, the device and method according to the present invention allow water to be filtered from the oils thanks to a system which behaves like a very high flow-rate filter (up to 100 $m^3/m^2$ h, with 0.1–0.2 bar of hydrostatic head on the filter), essentially based on a continuous water layer permanently formed above a support consisting of a layer of fully soaked hydrophilic material.

The operation to separate water from oil, through the barrier formed by said water layer supported by the layer of fibrils of hydrophilic material 8, takes place like a true and proper filtration.

Use can thus be made of any type of static or dynamic filtering devices available on the market, modified by replacing the conventional filtering cloths or panels with a layer of the hydrophilic material 8, previously soaked—until all air is expelled therefrom—according to the present invention.

There follow some practical examples of the method used to carry out the invention, which are by no means meant to limit the same.

EXAMPLE 1

Separation of fresh water from lubricating oil

A circular filtering panel, about 4 cm high, was introduced by flagging into a static separation device according to the present invention, having a cross-section of 0.125 m and consisting of a cylinder with an inside diameter of 400 mm.

The filtering panel was protected and supported by two stainless steel nets with a 3 mm mesh. The hydrophilic material used for the filtering panel consisted of cotton fibrils, washed and pretreated as described heretofore. The separation device was fed with a mixture of 3% oil (FIAT VS oil) in water; up to forming a constant hydrostatic head on the filter bed of about 1 m of the mixture. The whole system was kept in circulation by recycling the filtered water, after having mixed the same with the separated oil.

The test was continued for 48 hours and gave, on an average, the following results:

flow rate through the filter: 40 $m^3/m^2$ h;

lubricating oil content in the filtered water: less than 3 mg/kg.

EXAMPLE 2

Separation of petroleum from sea water

A rectangular filtering panel, about 5 cm high, was introduced by flanging into a static separation device according to the present invention, having a cross-section of 0.5 $m^2$.

The filtering panel was protected and supported by two stainless steel nets with a 3 mm mesh. The hydrophilic material consisted of a bottom layer of acrylic fibrils, to which were subsequently superposed layers of cotton fibrils up to reaching the desired height of 5 cm.

The separation device was fed with a mixture of 10% petroleum in sea water, up to forming a constant hydrostatic head on the filter bed of about 1.2 m of the mixture. The whole system was kept in circulation by recycling the filtered water, after having mixed the same with the separated petroleum.

The test was continued for a long while and gave, on an average, the following results:

flow rate through the filter: 32 $m^3/m^2$ h;

content of $CCl_4$ extractable substances in the filtered sea water: below 5 mg/kg.

EXAMPLE 3

Separation of Diesel oil from water

A square filtering panel, about 3 cm high, was introduced by flanging into a static separation device according to the present invention, having a 20×20 cm cross-section.

The filtering panel was protected and supported by two stainless steel nets with a 3 mm mesh. The hydrophilic material consisted of a bottom layer of acrylic fibrils, to which were subsequently superposed layers of cotton fibrils up to reaching the desired height of 3 cm.

The separation device was fed with a mixture of 5% Diesel oil in water, up to forming a constant hydrostatic head on the filter bed of about 0.7 m of the mixture. The whole system was kept, in circulation by recycling the filtered water, after having mixed the same with the separated Diesel oil.

The test was continued for a long while and gave, on an average, the following results:

flow rate through the filter: 48 $m^3/m^2$ h;

no residual Diesel oil in the filtered water.

As can be understood from the above description, the invention allows to separate mixtures based on water and oil with a very high selectivity and efficiency, in a definitely economic way, and by means of a very simple device.

For what concerns the mixtures to be treated, these can evidently be of various types, even containing many different components, provided that one of the components is a hydrophilic component and that at least another component cannot be mixed therewith.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A device for separating two components of a mixture having at least partially non-miscible liquids, that form heavier and lighter components of said mixture, comprising:
   a hollow body having an inlet port to feed said mixture, a first outlet port and a second outlet port to respectively discharge separate heavier and lighter components of said mixture, and a filter positioned between said first and second outlet ports;
   said filter being thoroughly and permanently soaked, so that no air is trapped therein, with only one of the components of said mixture, said filter being soaked prior to use for separating the components of the mixture; and
   said filter being positioned between said inlet port and said first outlet port that is an outlet port of said one component that soaks said filter, wherein the filter remains soaked with said one component during separation of the two components, and wherein the filter forms a barrier to said other component during separation of the two components.

2. The device as in claim 1, wherein one of said liquids is water, or a liquid similar to water or apt to be mixed therewith, and at least another one of said liquids is an oily liquid, wherein said filter is formed of an hydrophilic material, is soaked with clean water, and is positioned between said inlet port and said first outlet port.

3. The device as in claim 2, wherein said hydrophilic material is in the form of a finely divided particulate.

4. The device as in claim 3, wherein individual particles of said particulate have one of their dimensions larger than the other two.

5. The device as in claim 3, wherein individual particles of said particulate have a largest dimension of their cross-section in the range from 10 to 3000 μm, and their length in the range from 2 to 50 mm.

6. The device as in claim 2, wherein said hydrophilic material is selected from a group formed by vegetal, natural or synthetic fibers, or mixtures thereof.

7. The device as in claim 6, wherein said hydrophilic material is formed of short portions of said fibers, having a length in the range from 2 to 50 mm.

8. The device as in claim 6, wherein said hydrophilic material is formed of spinning wastes or spinning dust.

9. The device as in claim 6, wherein said hydrophilic material is formed of non-woven cloths of said fibers.

10. The device as in claim 2, wherein said filter of hydrophilic material through which flows one of said components, has walls formed by nets.

11. The device as in claim 2, wherein said inlet port extends into said hollow body with a duct ending into a conical diffuser facing away from the filter.

12. The device as in claim 2, wherein said first outlet port is connected to a trap device.

13. The device as in claim 12, wherein said trap device has an outlet thereof at a level higher than the filter.

14. The device as in claim 2, wherein said second outlet port is a spillway outlet of said hollow body.

15. The device as in claim 1, wherein said filter has voids and wherein a percentage of said voids in the filter is in the range from 5 to 80% in volume.

16. The device as claim 1, wherein said hollow body is a cylinder having a circular or rectangular cross-section.

17. A method for separating two components of a mixture of at least partially non-miscible liquids that form heavier and lighter components thereof, carried out in a chamber having an inlet port to feed said mixture and first and second outlet ports to discharge the separated components, comprising the steps of:
   a) dipping a filter positioned between said inlet port and one of first and second said outlet ports into only one of the components of said mixture, up to fully expelling any air trapped in the filter, and thoroughly soaking a filtering bed of the filter;
   b) causing said mixture to pass through said previously soaked and deaerated filter under a predetermined hydrostatic head;
   c) recovering said one of the components, used in the step a), from the first outlet port facing a side of the filter opposite to that facing the inlet port, while maintaining the filtering bed soaked with said one of the components of said mixture; and
   d) recovering the other component from the second outlet port facing a same side of the filter as the inlet port such that said filtering bed forms a barrier to said other component.

18. The method as in claim 17, wherein one of said liquids is water, or a liquid similar to water or apt to be mixed therewith, and at least another one of said liquids is an oily liquid, and wherein said filter is formed of hydrophilic material, is soaked with clear water, and is positioned between said inlet port and the first outlet port through which is discharged a separated aqueous component of the mixture.

19. The method as in claim 18, wherein said hydrophilic material is in the form of a finely divided particulate.

20. The method as in claim 19, wherein individual particles of said particulate have one of their dimensions larger than the other two.

21. The method as in claim 19, wherein individual particles of said particulate have a largest dimension of their cross-section in the range from 10 to 3.000 μm, and their length in the range from 2 to 50 mm.

22. The method as in claim 18, wherein said hydrophilic material is selected from a group formed by vegetal or natural fibers, or synthetic fibers, or mixtures thereof.

23. The method as in claim 22, wherein said hydrophilic material is formed of short portions of said fibers, having a length in the range from 2 to 50 mm.

24. The method as in claim 22, wherein said hydrophilic material is formed of spinning wastes or spinning dust.

25. The method as in claim 22, wherein said hydrophilic material is formed of non-woven cloths of said fibers.

26. The method as in claim 17, wherein said filter has voids and wherein a percentage of voids in the filter is in the range from 5 to 80% in volume.

27. The method as in claim 17, said hydrostatic head is in the range from 0.05 to 5 m of water.

28. The method as in claim 27, wherein said hydrostatic head is obtained by controlling a level of the mixture above said filter at a predetermined height.

29. The method as in claim 27, wherein said hydrostatic head is obtained by means of a pumping device.

30. The method as in claim 17, wherein a flow of said mixture in the filter is a laminar flow.

31. The method as in claim 17 wherein flowing speed of said mixture in the filter is in the range from 0.001 to 0.1 m/s.

* * * * *